US012530881B2

(12) United States Patent
Kou et al.

(10) Patent No.: US 12,530,881 B2
(45) Date of Patent: Jan. 20, 2026

(54) HARDWARE ADAPTIVE MULTI-MODEL SCHEDULING

(71) Applicants: Baidu.com Times Technology (Beijing) Co., Ltd., Beijing (CN); Baidu USA LLC, Sunnyvale, CA (US)

(72) Inventors: Haofeng Kou, Palo Alto, CA (US); Xing Li, Santa Clara, CA (US); Huimeng Zheng, Beijing (CN); Lei Wang, Beijing (CN); Zhen Chen, Beijing (CN)

(73) Assignees: Baidu.com Times Technology (Beijing) Co., Ltd., Beijing (CN); Baidu USA LLC, Sunnyvale, CA (US)

( * ) Notice: Subject to any disclaimer, the term of this patent is extended or adjusted under 35 U.S.C. 154(b) by 273 days.

(21) Appl. No.: 18/556,636

(22) PCT Filed: Aug. 16, 2021

(86) PCT No.: PCT/CN2021/112794
§ 371 (c)(1),
(2) Date: Oct. 20, 2023

(87) PCT Pub. No.: WO2023/019397
PCT Pub. Date: Feb. 23, 2023

(65) Prior Publication Data
US 2024/0185587 A1 Jun. 6, 2024

(51) Int. Cl.
*G06V 10/00* (2022.01)
*G06V 10/776* (2022.01)
(Continued)

(52) U.S. Cl.
CPC ............ *G06V 10/776* (2022.01); *G06V 10/82* (2022.01); *G06V 10/955* (2022.01)

(58) Field of Classification Search
CPC ............ G06N 3/02; G06N 3/08; G06N 3/042; G06N 3/045; G06N 3/047; G06N 3/082;
(Continued)

(56) References Cited

U.S. PATENT DOCUMENTS 9,324,321 B2 * 4/2016 Xue ........................ G06N 3/082
9,858,919 B2 * 1/2018 Saon ........................ G10L 17/18
(Continued)

FOREIGN PATENT DOCUMENTS

WO 2021068243 4/2021

OTHER PUBLICATIONS

International Search Report dated May 9, 2022, in the International Patent Application No. PCT/CN2021/112794. (3 pgs).
(Continued)

*Primary Examiner* — Amir Alavi
(74) *Attorney, Agent, or Firm* — Oppedahl Patent Law Firm LLC

(57) ABSTRACT

Modem deep neural network (DNN) models have many layers with a single layer potentially involving large matrix multiplications. Such heavy calculation brings challenges to deploy such DNN models on a single edge device, which has relatively limited computation resources. Therefore, multiple and even heterogeneous edge devices may be required for applications with stringent latency requirements. Disclosed in the present patent documents are embodiments of a model scheduling framework that schedules multiple models on a heterogeneous platform. Two different approaches, model first scheduling (MFS) and hardware first scheduling (HFS), are presented to allocate a group of models for a service into corresponding heterogeneous edge devices, including CPU, VPU and GPU. Experimental results prove
(Continued)

the effectiveness of the MFS and HFS methods for improving the inference speed of single and multiple AI-based services.

32 Claims, 9 Drawing Sheets

(51) Int. Cl.
  *G06V 10/82* (2022.01)
  *G06V 10/94* (2022.01)
(58) Field of Classification Search
  CPC ...... G06N 3/088; G06N 3/092; G06N 3/0454;
    G06N 3/0475; G06N 3/0464; G06V
    10/82; G06V 10/761; G06V 10/762;
    G06V 10/764; G06V 10/765; G06V
    10/776; G06V 10/955; G06V 40/161
  See application file for complete search history.

(56) References Cited

U.S. PATENT DOCUMENTS

| | | | | |
|---|---|---|---|---|
| 11,455,807 | B2* | 9/2022 | Ratnesh Kumar | G06F 18/2413 |
| 11,461,650 | B2* | 10/2022 | Saha | G06F 16/55 |
| 11,989,888 | B2* | 5/2024 | Chan | G06N 3/09 |
| 12,033,391 | B2* | 7/2024 | Singh | G06N 3/02 |
| 12,045,713 | B2* | 7/2024 | Zhang | G06F 18/2433 |
| 12,175,732 | B2* | 12/2024 | Gupta | G06V 10/761 |
| 2014/0046885 | A1 | 2/2014 | Majumdar et al. | |
| 2018/0241843 | A1 | 8/2018 | Bardhan | |
| 2018/0330238 | A1* | 11/2018 | Luciw | G06N 3/044 |
| 2023/0244525 | A1* | 8/2023 | Hu | G06N 3/08 |
| | | | | 718/102 |
| 2024/0185587 | A1* | 6/2024 | Kou | G06V 10/955 |
| 2024/0266074 | A1* | 8/2024 | Smurro | G16H 80/00 |

OTHER PUBLICATIONS

International Written Opinion dated May 9, 2022, in the International Patent Application No. PCT/CN2021/112794. (4pgs).

Lee et al., "The Hardware and Algorithm Co-Design for Energy-Efficient DNN Processor on Edge/Mobile Devices," IEEE Transactions on Circuits and Systems-I: Regular Papers, vol. 67, No. 10, Oct. 2020. (13pgs).

Hoa et al., "FPGA/DNN Co-Design: An Efficient Design Methodology for IoT Intelligence on the Edge", 56th ACM/IEEE Design Automation Conference (DAC), Jun. 6, 2019. (6pgs).

* cited by examiner

400

```
┌─────────────────────────────────────────────────┐
│ Given a performance metric array for a group of │
│ neural network models for an AI-based service,  │
│ identifying a worst performance parameter and a │──╮ 405
│ neural network model associated with the         │
│ worst performance parameter                      │
└─────────────────────────────────────────────────┘
                         │
                         ▼
┌─────────────────────────────────────────────────┐
│ Identifying an edge device with the best         │──╮ 410
│ performance parameter for the identified neural  │
│ network model                                    │
└─────────────────────────────────────────────────┘
                         │
                         ▼
┌─────────────────────────────────────────────────┐
│ Allocating the identified edge device to the     │──╮ 415
│ identified neural network model for operation    │
└─────────────────────────────────────────────────┘
                         │
                         ▼
┌─────────────────────────────────────────────────┐
│ Iteratively updating the performance metric      │
│ array with the allocated edge device and the     │
│ allocated neural network removed for subsequent  │──╮ 420
│ identifying and allocation processes, until all  │
│ neural network models are allocated.             │
└─────────────────────────────────────────────────┘
```

HARDWARE ADAPTIVE MULTI-MODEL SCHEDULING

TECHNICAL FIELD

The present disclosure relates generally to systems and methods for computer learning that can provide improved computer performance, features, and uses. More particularly, the present disclosure relates to systems and methods for hardware adaptive multi-model scheduling.

BACKGROUND

Deep neural networks (DNNs) have achieved great successes in many domains, such as computer vision, natural language processing, recommender systems, etc. The research of DNNs has been gaining ever-increasing impetus due to their state-of-the-art performance across diverse application scenarios. Each year, a multitude of new DNN architectures are proposed for emerging intelligent services with more stringent requirements on accuracy improvement, latency reduction, privacy-preserving, energy efficiency, etc.

However, most DNNs focus on boosting accuracy at the expense of substantially increased model complexity. The depth of the current state-of-the-art networks may reach dozens or even hundreds of layers to outperform previous networks for related tasks in terms of accuracy. A single layer may require millions of matrix multiplications. Such heavy calculation brings challenges for deploying these DNN models on a single edge device with limited computation resources.

Therefore, multiple and even heterogeneous edge devices may be required for artificial intelligence (AI) driven applications with stringent latency requirements, which leads to the prevalent many-to-many problem (multi-models to heterogeneous edge devices) in real-world applications.

Accordingly, what is needed are systems, devices and methods that address the above-described issues for hardware adaptive multi-model scheduling in heterogeneous platforms.

SUMMARY

In a first aspect, a computer-implemented method for multi-model scheduling is provided. The method includes: given a performance metric array for a group of neural network models to provide an artificial intelligence (AI) based service in a heterogeneous hardware platform comprising multiple edge devices, identifying a worst performance parameter in the performance metric array and a neural network model associated with the worst performance parameter; identifying an edge device, among the multiple edge devices, with the best performance parameter for the identified neural network model; allocating the identified edge device to the identified neural network model; and iteratively updating the performance metric array with the allocated edge device and the allocated neural network removed for subsequent identifying and allocation processes, until the group of neural network models are allocated to obtain a first set of allocation results.

In a second aspect, a computer-implemented method for multi-model scheduling is provided. The method includes: given a performance metric array for a group of neural network models to provide an artificial intelligence (AI) based service in a heterogeneous hardware platform comprising multiple edge devices, identifying a worst performance parameter in the performance metric array and an edge device associated with the worst performance parameter; identifying a neural network model, among the group of neural network models, with the best performance parameter for the identified edge device; allocating the identified neural network model to the identified edge device; and iteratively updating the performance metric array with the allocated edge device and the allocated neural network removed for subsequent identifying and allocation processes, until the group of neural network models are allocated to obtain a first set of allocation results.

In a third aspect, a non-transitory computer-readable medium or media is provided. The computer-readable medium or media includes one or more sequences of instructions which, when executed by at least one processor, causes steps for multi-model scheduling comprising: obtaining a performance metric array for a group of neural network models to provide an artificial intelligence (AI) based service in a heterogeneous hardware platform comprising multiple edge devices, the performance metric array comprises a plurality of performance parameters, each performance parameter is obtained by independently running one neural network model, among the group of neural network models, on one of the multiple edge devices; implementing a model first scheduling (MFS) process and a hardware first scheduling (HFS) from the performance metric array to obtain MFS allocation results and HSF allocation results respectively, the MFS allocation results define allocations between the group of neural network models and the multiple edge devices using the MFS process, the HFS allocation results define allocations between the group of neural network models and the multiple edge devices using the HFS process; and responsive to the MFS allocation results being different from the HFS allocation results, running the group of neural network models on the heterogeneous hardware platform based on the MFS allocation results and the HFS allocation results respectively for a performance comparison, the allocation results, between the MFS allocation results and the HFS allocation results, having higher performance are chosen for model allocations.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. 4 depicts a process for the MFS, according to embodiments of the present disclosure.

DETAILED DESCRIPTION OF EMBODIMENTS

Figure 1:
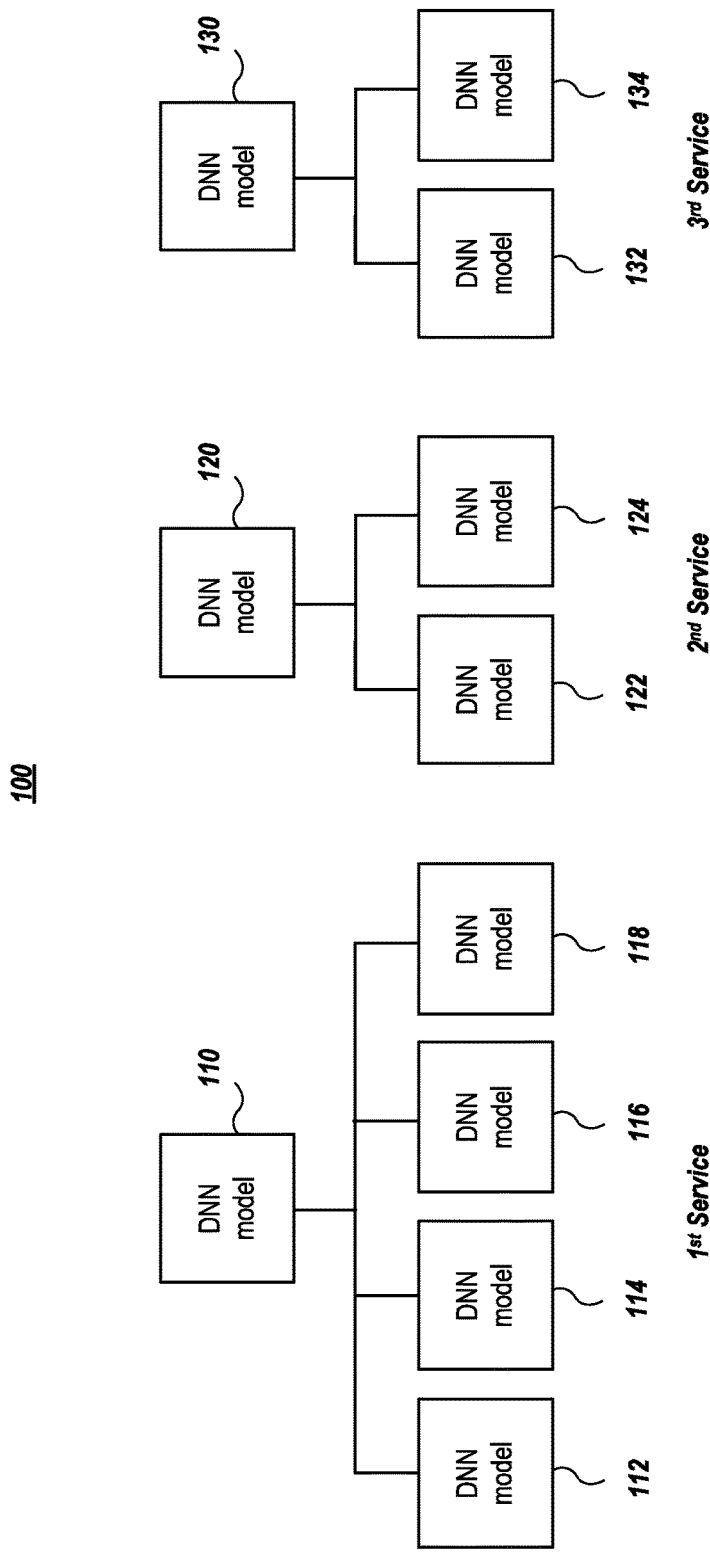
FIG. 1 depicts multiple groups of DNN models for different AI-based services, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," "comprising," or any of their variants shall be understood to be open terms and any lists that follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); (5) an acceptable outcome has been reached; and (6) all of the data has been processed.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. GENERAL INTRODUCTION

Modern DNNs may have dozens or even hundreds of layers, with a single layer potentially involving millions of matrix multiplications. Such heavy calculation brings challenges for deploying such DNN models on a single edge device, which has relatively limited computational resources. Therefore, multiple and even heterogeneous edge devices may be required for the AI-driven applications with stringent latency requirements, which leads to the prevalent many-to-many problem (multi-models to heterogeneous edge devices) in real-world applications.

However, different types of hardware platforms (e.g., personal computers, smartphones, and Internet of Things (IoT) devices) usually have their own limitations and computation capacities, e.g., memory footprints and floating-point operations per second (FLOPS). If a single neural network model is deployed on an inappropriate edge device, its inference time may exceed an order of magnitude than a designed interval. Besides, due to differences in hardware and device drivers, even two edge devices with similar overall speeds (e.g., central processing units (CPUs) from different manufacturers) may not be able to support the same DNN model or may have significant differences in performance.

Furthermore, there might be a non-negligible relationship between DNN models in the real-world applications. Multiple DNNs may need to work collaboratively for a real-world artificial intelligence (AI)-based service. For example, an output of one DNN might be the input of several DNN models for the next steps of analysis. These DNN models need to work together to meet certain real-time requirement on different hardware architectures including CPU, graphics processing unit (GPU), and vision processing unit (VPU), etc. Such a collaboration requirement brings challenges to schedule multiple models among heterogeneous edge devices. Accordingly, it is crucial to ensure that a range of collaborative DNN models may be deployed and executed collaboratively and effectively on heterogeneous edge devices.

Disclosed in the present patent documents are embodiments of a hardware adaptive multi-model scheduling framework that schedules a group of models on the heterogeneous platforms to not only solve the aforementioned open issues but also improve the overall inference speed.

B. EMBODIMENTS OF HARDWARE ADAPTIVE MULTI-MODELS SCHEDULING

FIG. 1 depicts multiple DNN models for heterogeneous computing, according to embodiments of the present disclosure. These multiple DNN models are all image recognition related models and may be collaborated in groups for various services. For example, DNN models 110, 112, 114, 116, and 118 form a model group for a first AI-based service; DNN models 120, 122, and 124 form a model group for second AI-based service; DNN models 130, 132, and 134 form a model group for third AI-based service. To provide a full service for an AI-based service, all DNN models related to the service may need to be deployed and operable in a hardware platform.

In one or more embodiments, the first AI-based service is a human face detection service (hereinafter "Service F") with the DNN models 110, 112, 114, 116, and 118 for face detection, age/gender recognition, head pose estimation, emotion recognition, and facial landmarks respectively. The second AI-based service is a person detection service (hereinafter "Service P") with the DNN models 120, 122, and 124 for person detection, person attributes recognition, and person re-identification respectively. The third AI-based service is a vehicle-related detection service (hereinafter "Service V") with the DNN models 130, 132, and 134 for vehicle and license plate detection, vehicle plate recognition, and vehicle attributes recognition respectively.

In one or more embodiments, there is dependency among DNN models for each service. Accordingly, the multiple collaborative DNN models for each service may need to be deployed in a collaborative manner, e.g., concurrently, sequentially, hierarchically, or a combination thereof, etc. For example, the multiple collaborative DNN models for service F may comprise a first DNN model 110, a second DNN model 112, a third DNN model 114, a fourth DNN model 116, and a fifth DNN model 118, as shown in FIG. 1. The first DNN model 110 may be positioned in the first hierarchical level, while the other four DNN models 112, 114, 116, and 118 are positioned in parallel in a second hierarchical level. When providing Service F, it is after an initial detection using the first DNN model 110 for face detection that the other four DNN models may be executed. The second DNN model 112, the third DNN model 114, the fourth DNN model 116, and the fifth DNN model 118 are for age/gender recognition, head pose estimation, emotion recognition, and facial landmarks respectively.

Similarly, for Service P, the first DNN model 120 may be positioned in the first hierarchical level for person detection, while the other two DNN models 122 and 124 are positioned in parallel in a second hierarchical level for person attributes recognition and person re-identification respectively. When providing Service P, the DNN models 122 and 124 may be executed after an initial detection using the DNN model 120. For Service V, the first DNN model 130 may be positioned in the first hierarchical level for vehicle and license plate detection, while the other two DNN models 132 and 134 are positioned in parallel in a second hierarchical level for vehicle plate recognition and vehicle attributes recognition respectively. When providing Service V, the DNN models 132 and 134 may be executed after an initial detection using the DNN model 130.

In one or more embodiments, the DNN models in FIG. 1 are trained and optimized for desired performance. The training and optimization may be done on cloud with more computation resources, e.g., more memory space and faster processors, compared to heterogeneous edge devices to which the DNN models are fitted. In one or more embodiments, configurations or specifications of the heterogeneous edge devices may be used for optimization to ensure that the DNN models may be deployable and operable on the heterogeneous edge devices.

For example, if a DNN model is trained and optimized in a cloud server with a 64-bit operating system, while an edge device is running a 32-bit system, the DNN model may need to be optimized with at least some of the data format transformed from 64-bit format into 32-bit format. In another example, if a DNN model is trained and optimized in a cloud server having a large cache capable of handling a large data block, while the given edge device may have a relatively smaller cache not sufficient to handle the same size of data block, the DNN model may need to be optimized with a data block segmented into multiple "smaller" data blocks. In yet another example, a DNN model may be trained and optimized in a cloud server capable of supporting multiple threads of parallel computation, while the given edge device may only support smaller numbers of threads for parallel computation. The DNN model may need to be optimized with the number of allowable threads reduced for parallel computation when scheduling parallel computation tasks. In yet another example, if a DNN model is trained in cloud with Caffe/TensorFlow/Paddle-Paddle framework, while a given edge device does not support such framework but has its own embedded framework, the DNN model may need to be optimized with the DNN models' format transferred as a format supported by the embedded framework of the edge device.

TABLE 1

DNN models for various AI-based services with examples of FGLOPS

| | DNN model | GFLOPS |
|---|---|---|
| Service F | Face Detection | 1.48 |
| | Age/Gender Recognition | 0.047 |
| | Emotions Recognition | 0.053 |
| | Facial Landmarks | 0.064 |
| | Head Pose Estimation | 0.021 |
| Service P | Person Detection | 3.964 |
| | Person Attributes Recognition | 0.174 |
| | Person Re-identification | 3.5213 |
| Service V | Vehicle and License Plate Detection | 0.349 |
| | Vehicle Attributes Recognition | 0.126 |
| | License Plate Recognition | 0.328 |

In one or more embodiments, those DNN models may have different performance speeds, which may be indexed by floating-point operations per second (FLOPS). Table 1 shows various DNN models for different AI-based services with corresponding GFLOPS (giga-FLOPS, or billion FLOPS). The GLOPS numbers may be obtained when the DNN models operate in a computing platform, e.g., a cloud server, with adequate sources.

Figure 2:
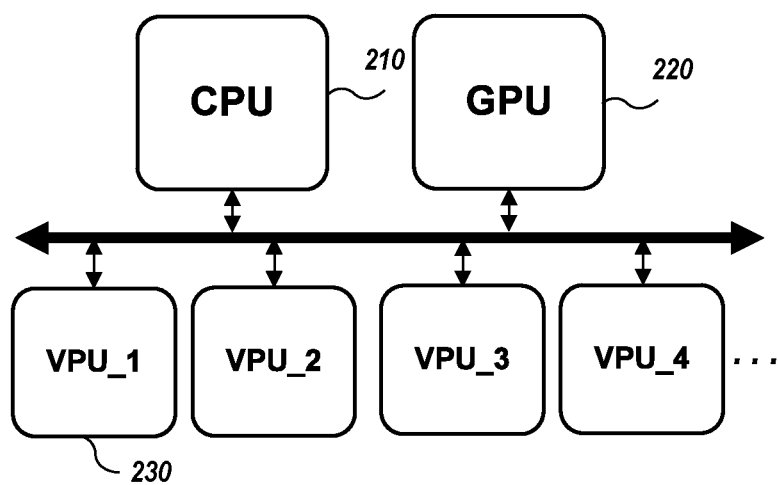
FIG. 2 depicts a heterogeneous hardware platform for heterogeneous computing, according to embodiments of the present disclosure.

FIG. 2 depicts a heterogeneous hardware platform for heterogeneous computing, according to embodiments of the present disclosure. The hardware platform may comprise different types of edge devices, e.g., one or more CPUs 210, one or more graphics processing units (GPUs) 220, and one or more vision processing units (VPUs) 230. In one or more embodiments, the multiple DNN models to be deployed on the heterogeneous hardware platform may be operable on each type of the edge devices. Described hereinafter are embodiments of adaptive scheduling of the models onto different types of edge devices in the heterogeneous hardware platform for performance improvement.

In one or more embodiments, a model initialization function is executed to calculate a performance parameter of each neural network model for a service with each model running independently on each type of edge devices to get a performance metric array for the group of neural network models for the service. In one or more embodiments, the performance parameter is frame per second (FPS), which defines the speed of a model to process an input video or image frames for desired detection. Tables 2A, 2B, and 2C shows the performance parameters (FPS) of DNN models for service F, service P, and service V respectively when the models are running on different edge devices. For each service, a performance metric array (e.g., a table) is obtained to represent performances of each DNN model operating on each type of edge device in the heterogeneous hardware platform. In each table, higher number means a higher performance with the highest number shown in bold font. For example, in Table 2A, the DNN model for emotion recognition has a FPS of 514.46 when running on GPU, a FPS of 212.06 running on CPU. Therefore, this model would be more efficient if it is operating on GPU instead of CPU.

It shall be understood the different edge devices may not be limited as different types of devices, e.g., CPU, GPU, and VPU as shown in Tables 2A-2C. The different edge devices may also be applicable to the same type of device but in different architecture (e.g., x86 based CPU and ARM based CPU), the same type of device but in different structures (e.g., singe core CPU or multi-core CPU), or the same type of device but in different parameters (e.g., CPU with different clock speeds or cache sizes), etc.

TABLE 2A

FPS of DNN models (Service F) running on different edge devices

|     | Face Detection | Age/Gender Recognition | Emotion Recognition | Facial Landmarks | Head Pose Estimation |
|-----|---|---|---|---|---|
| CPU | 8.69 | 241.06 | 212.06 | 265.37 | 241.46 |
| GPU | 37.46 | 370.82 | 514.46 | 151.77 | 389.72 |
| VPU | 12.93 | 399.99 | 345.88 | 185.42 | 317.52 |

TABLE 2B

FPS of DNN models (Service P) running on different edge devices

|     | Person Detection | Person Attributes Recognition | Person Re-identification |
|-----|---|---|---|
| CPU | 3.30 | 132.35 | 116.68 |
| GPU | 17.62 | 198.82 | 113.30 |
| VPU | 3.73 | 168.40 | 111.76 |

TABLE 2C

FPS of DNN models (Service V) running on different edge devices

|     | Vehicle and License Plate Detection | Vehicle Attributes Recognition | License Plate Recognition |
|-----|---|---|---|
| CPU | 65.03 | 217.84 | 76.37 |
| GPU | 131.31 | 311.73 | 199.57 |
| VPU | 37.68 | 406.85 | 164.93 |

Once the performance metric array of all models for a service in a heterogeneous hardware platform is obtained, various methods may be used for model scheduling onto the heterogeneous hardware platform to enhance the overall performance, e.g., inference speed, for all the models during operation. In one or more embodiments, the various methods may comprise a model first scheduling (MFS) method, a hardware first scheduling (HFS) method, or a combination or MFS and HFS.

1. Embodiments of Model First Scheduling

Figure 3:
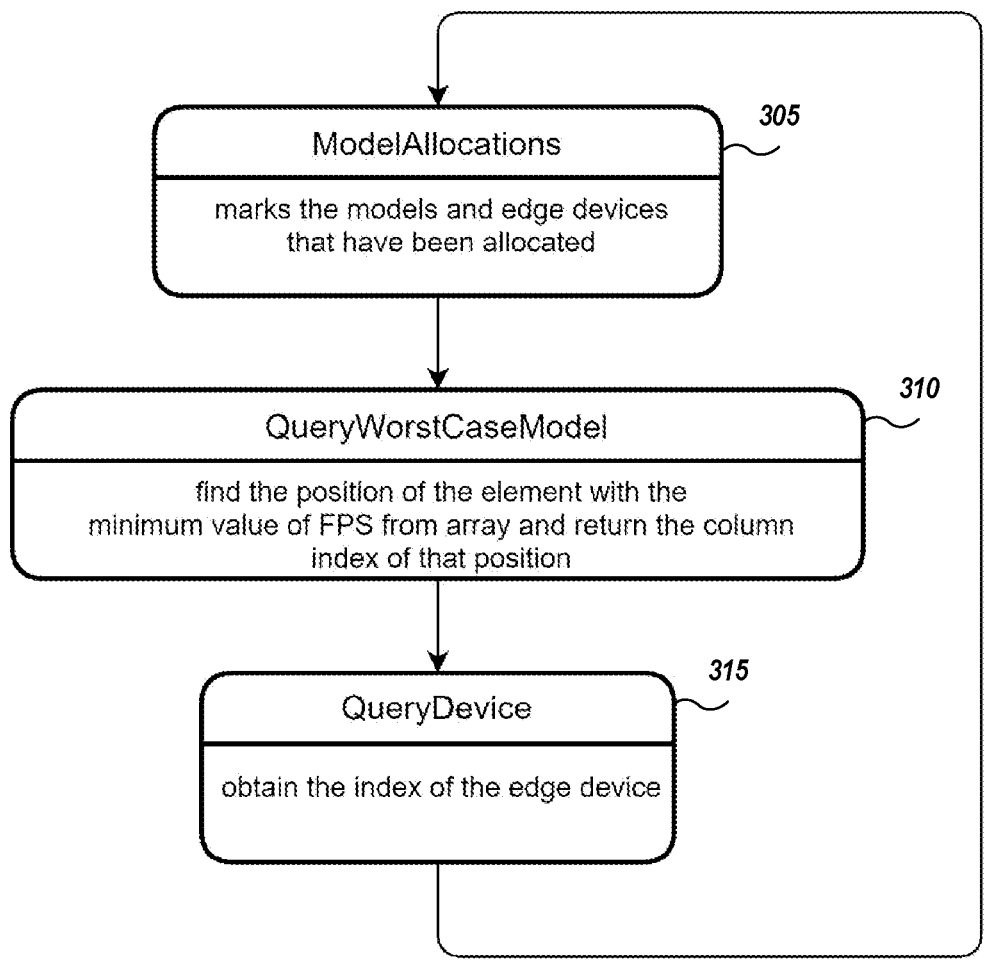
FIG. 3 depicts a high-level block diagram for a model first scheduling (MFS) method, according to embodiments of the present disclosure.

FIG. 3 depicts a high-level block diagram for a MFS method, according to embodiments of the present disclosure. The MFS method comprises three functions, including a model allocation function 305, a worst-case-model-query function 310, and a device query function 315. The model allocation function is used to allocate models to corresponding edge devices. The worst-case-model-query function and the device query function are two functions that the model allocation function depends on. Details regarding the processes and the functions are described below with Table 2B as an example for explanation.

Given the performance metric array shown in Table 2B, the worst-case-model-query function 310 identifies the worst performance parameter (e.g., the lowest FPS) and a model associated with the worst performance parameter. For the layout shown in Table 2B, each row index is related to a type of edge device and each column index is related to one DNN model. For the worst performance parameter (3.30) in Table 2, the corresponding DNN model (or column index) is the face detection model (when the model is operating on CPU). The worst performance parameter would be a bottleneck that would limit the performance for Service P the most, if this DNN model is operating on the CPU. Therefore, such a worst performance parameter shall be avoided in the very beginning during the process of model scheduling.

Once the worst-case-model-query function 310 identifies the DNN model associated with the worst performance parameter, the device query function 315 identifies a device (e.g., a row index as shown in Table 2B) of an edge device (e.g., GPU) with the best performance parameter (17.63) to the identified model. Afterwards, the model allocation function 305 allocates the identified edge device to the identified DNN model.

In one or more embodiments, the performance metric array is updated with allocated edge device(s) and model(s) removed in subsequent model scheduling process. For example, the performance metric array in table 2A is updated as shown in FIG. 3 once the GPU and the person detection model are removed. The worst-case-model-query function 310 identifies the worst performance parameter from the updated performance metric array, and the aforementioned identification and allocation processes are repeated until all models and devices are allocated.

TABLE 3

Updated metric array of DNN models for Service P after
first round of model allocation with MFS method

| | Person Attributes Recognition | Person Re-identification |
|---|---|---|
| CPU | 132.35 | 116.68 |
| VPU | 168.40 | 111.76 |

FIG. 4 depicts a process for the MFS approach, according to embodiments of the present disclosure. In step 405, given a performance metric array for a group of neural network models for an AI-based service in a heterogeneous hardware platform comprising multiple edge devices, a worst performance parameter (e.g., worst FPS) and a neural network model associated with the worst performance parameter are identified using a worst-case-model-query function. In step 410, an edge device with the best performance parameter (e.g., best FPS) for the identified neural network model is identified using a device query function. In step 415, the identified edge device is allocated, using a model allocation function, to the identified neural network model for operation. In step 420, the performance metric array is iteratively updated with the allocated edge device and the allocated neural network removed for subsequent identification and allocation processes from the updated performance metric array, until all neural network models are allocated. Each subsequent identification process comprises identifying a subsequent worst performance parameter and a subsequent neural network model associated with the subsequent worst performance parameter from the updated performance metric array, and identifying a subsequent edge device with the best performance parameter for the identified subsequent neural network model from the updated performance metric array. Each allocation process comprises allocating the identified subsequent edge device to the identified subsequent neural network model.

2. Embodiments of Hardware First Scheduling

Figure 5:
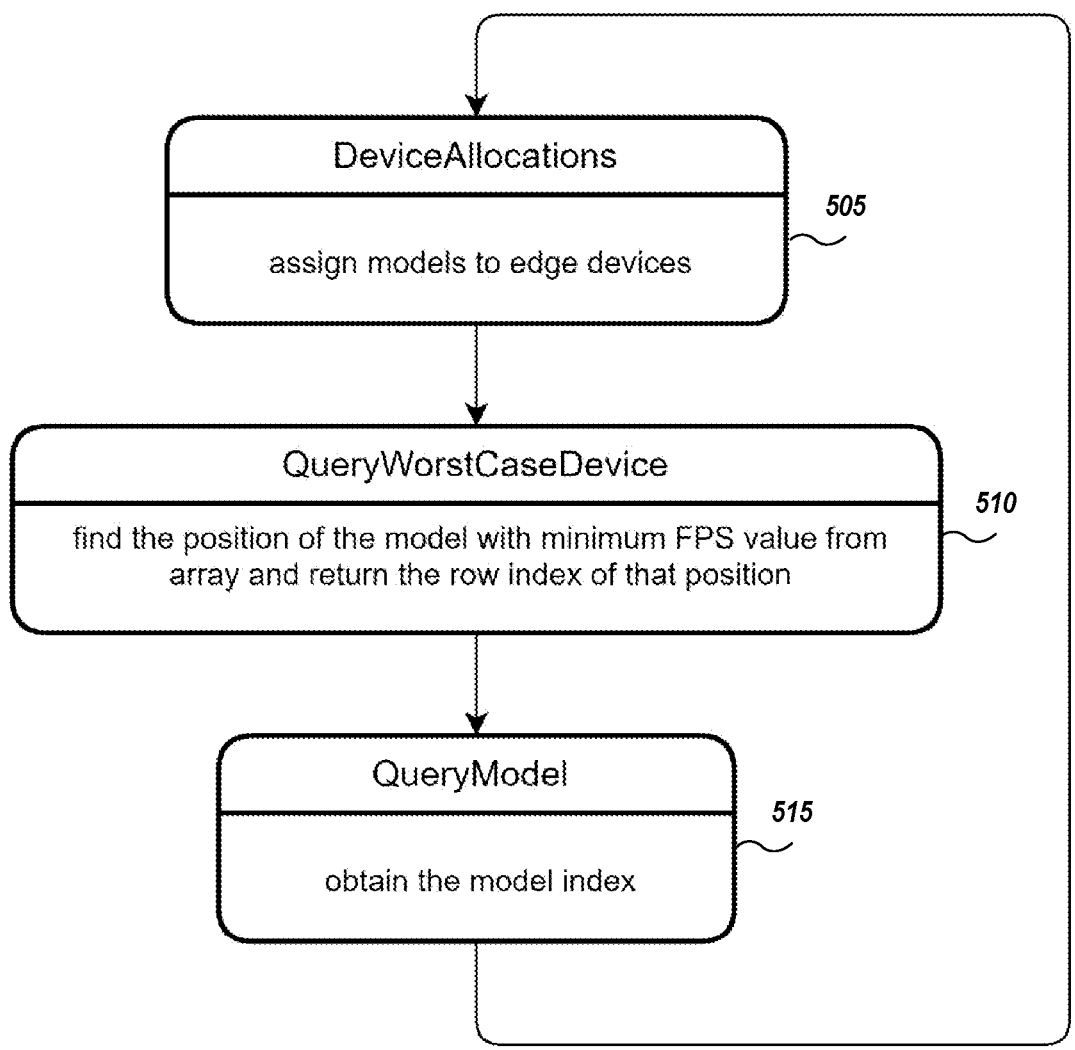
FIG. 5 depicts a high-level block diagram for a hardware first scheduling (HFS) method, according to embodiments of the present disclosure.

FIG. 5 depicts a high-level block diagram for a HFS method, according to embodiments of the present disclosure. The HFS method comprises three functions, including a device allocation function 505, a worst-case-device-query function 510, and a model query function 515. The device allocation function is used to assign edge devices to corresponding neural network models. The worst-case-model-query function and the model query function are two functions that the device allocation function depends on. Details regarding the processes and the functions are described below with Table 2B as an example for explanation.

Given the performance metric array shown in Table 2B, the worst-case-device-query function 510 identifies the worst performance parameter (e.g., the lowest FPS) and a device associated with the worst performance parameter. For the layout shown in Table 2B, each row index is related to a type of edge device and each column index is related to one DNN model. For the worst performance parameter (3.30) in Table 2, the corresponding edge device (or row index) is the CPU, on which the person detection model is running. The worst performance parameter would be a bottleneck that would limit the performance for Service P the most, if the CPU is allocated to run the person detection model. Such a worst performance parameter shall be avoided in the very beginning during the process of HSF.

Once the worst-case-device-query function 510 identifies the edge device associated with the worst performance parameter, the model query function 515 identifies a model (e.g., a column index as shown in Table 2B) (e.g., Person Attributes Recognition) with the best performance parameter (132.35) to the identified edge device (CPU). Afterwards, the device allocation function 505 allocates the identified model to the identified edge device.

In one or more embodiments, the performance metric array is updated with allocated edge device(s) and model(s) removed in subsequent model scheduling process. For example, the performance metric array in table 2A is updated as shown in FIG. 4 once the CPU and the person attributes recognition model are removed. The worst-case-device-query function 510 identifies the worst performance parameter from the updated performance metric array, and the aforementioned identification and allocation processes are repeated until all models and devices are allocated.

TABLE 4

Updated metric array of DNN models for Service P after
first round of model allocation with HFS method

| | Person Detection | Person Re-identification |
|---|---|---|
| GPU | 17.62 | 113.30 |
| VPU | 3.73 | 111.76 |

Figure 6:
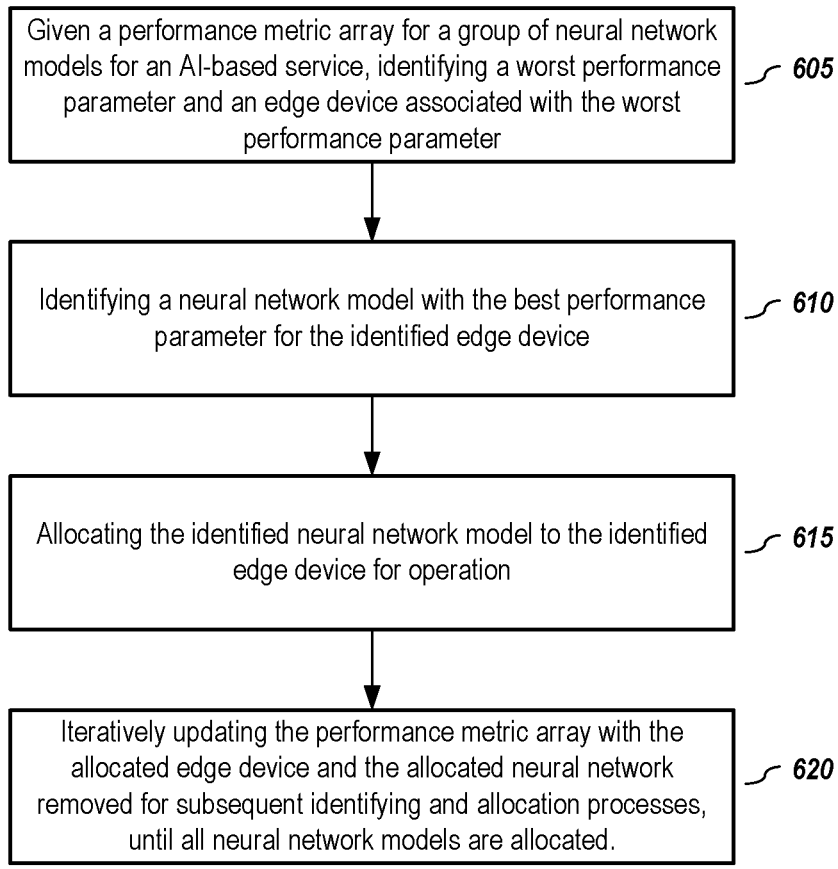
FIG. 6 depicts a process for the HFS, according to embodiments of the present disclosure.

FIG. 6 depicts a process for the HFS approach, according to embodiments of the present disclosure. In step 605, given a performance metric array for a group of neural network models for an AI-based service in a heterogeneous hardware platform comprising multiple edge devices, a worst performance parameter and an edge device associated with the worst performance parameter are identified using a worst-case-device-query function. In step 610, a neural network model with the best performance parameter for the identified edge device is identified using a model query function. In step 615, the identified neural network model is allocated, using a device allocation function, to the identified edge device for operation. In step 620, the performance metric array is iteratively updated with the allocated edge device and the allocated neural network removed for subsequent identifying and allocation processes from the updated performance metric array, until all neural network models are allocated. Each subsequent identification process comprises identifying a subsequent worst performance parameter and a subsequent edge device associated with the subsequent worst performance parameter from the updated performance metric array, and identifying a subsequent neural network model with the best performance parameter for the identified subsequent edge device from the updated performance metric array. Each allocation process comprises allocating the identified subsequent neural network model to the identified subsequent edge device.

3. Embodiments of a Combination of MFS and HFS

In one or more embodiments, the MFS and the HFS may be implemented separately and independently to obtain model allocation results respectively. Model allocation results using MFS may or may out be the same as model allocation results using HFS. Table 5 shows model allocation results using MFS and HFS for Service F, Service P, and Service V respectively. It is shown from the table that MFS results and HFS results may be different in certain models, e.g., the person attributes recognition model and person re-identification model for Service P. For Service P, MFS results and HFS results are completely different.

TABLE 5

Model allocation results using MFS and HFS

|  | DNN model | MFS | HFS |
|---|---|---|---|
| Service F | Face Detection | GPU | GPU |
|  | Age/Gender Recognition | VPU | VPU |
|  | Emotions Recognition | VPU | VPU |
|  | Facial Landmarks | CPU | CPU |
|  | Head Pose Estimation | VPU | VPU |
| Service P | Person Detection | GPU | GPU |
|  | Person Attributes Recognition | VPU | CPU |
|  | Person Re-identification | CPU | VPU |
| Service V | Vehicle and License Plate Detection | GPU | VPU |
|  | Vehicle Attributes Recognition | VPU | CPU |
|  | License Plate Recognition | CPU | GPU |

In one or more embodiments, the MFS and the HFS may be used in combination for further performance improvement. The MFS and HFS may be independently implemented first to obtain a first set of allocation results (MFS allocation results) and a second set of allocation results (HFS allocation results) respectively. The implementation of MFS and HFS may be concurrent or sequential. Responsive to the MFS allocation results being different from the HFS allocation results, the neural network models are operating on the heterogeneous hardware platform based on the MFS allocation results and the HFS allocation results respectively for a test running to make a performance comparison between the MFS allocation results and the HFS allocation results. The set of allocation results with higher performance (e.g., higher FPS) is chosen for final model allocation.

C. SOME EXPERIMENTS

It shall be noted that these experiments and results are provided by way of illustration and were performed under specific conditions using a specific embodiment or embodiments; accordingly, neither these experiments nor their results shall be used to limit the scope of the disclosure of the current patent document.

Figure 7:
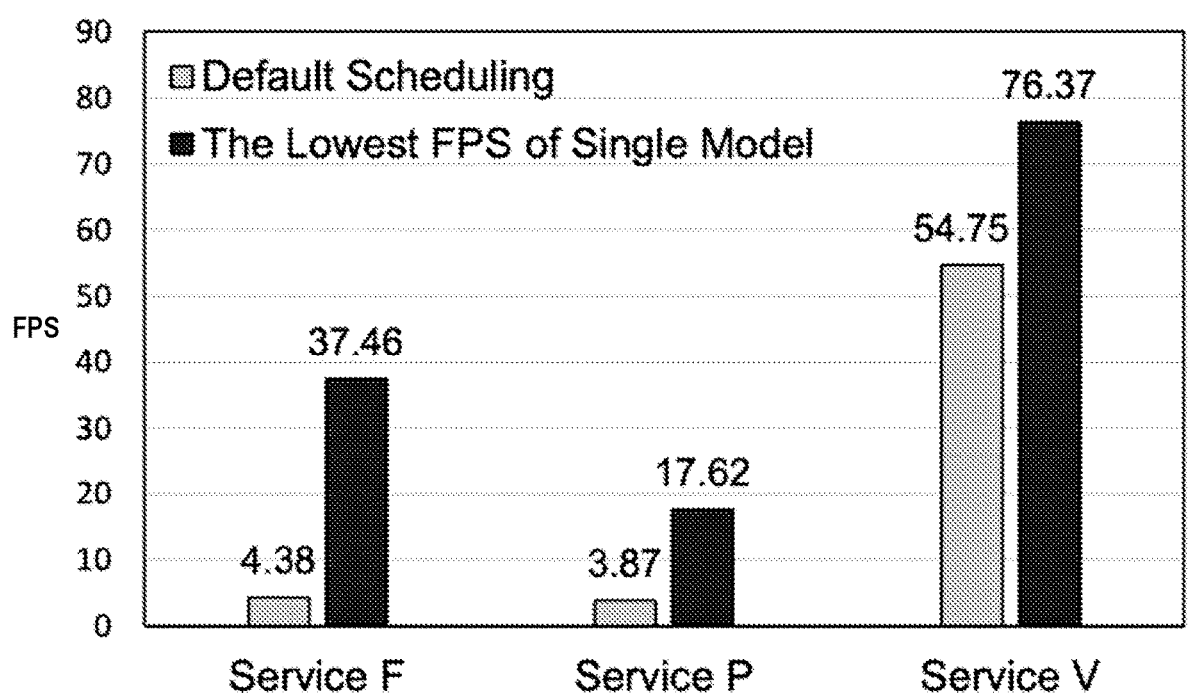
FIG. 7 graphically depicts a comparison between default scheduling results and single model results, according to embodiments of the present disclosure.

FIG. 7 graphically depicts a comparison between default scheduling results and single model results, according to embodiments of the present disclosure. Default scheduling for models related to a service is basing on the models' dependency relationship tree structure for the service. If there is always a detection model as the root of the model tree structure and all other models depend on this detection model, the detection model is scheduled to CP, as VPU(s) and GPU(s) depend on CPU, and then GPU for a second model of the model tree structure, all other models to VPU(s). As shown in FIG. 7, the default scheduling has better performance (in terms of FPS) compared to the lowest FPS of a single model for all three services.

Figure 8:
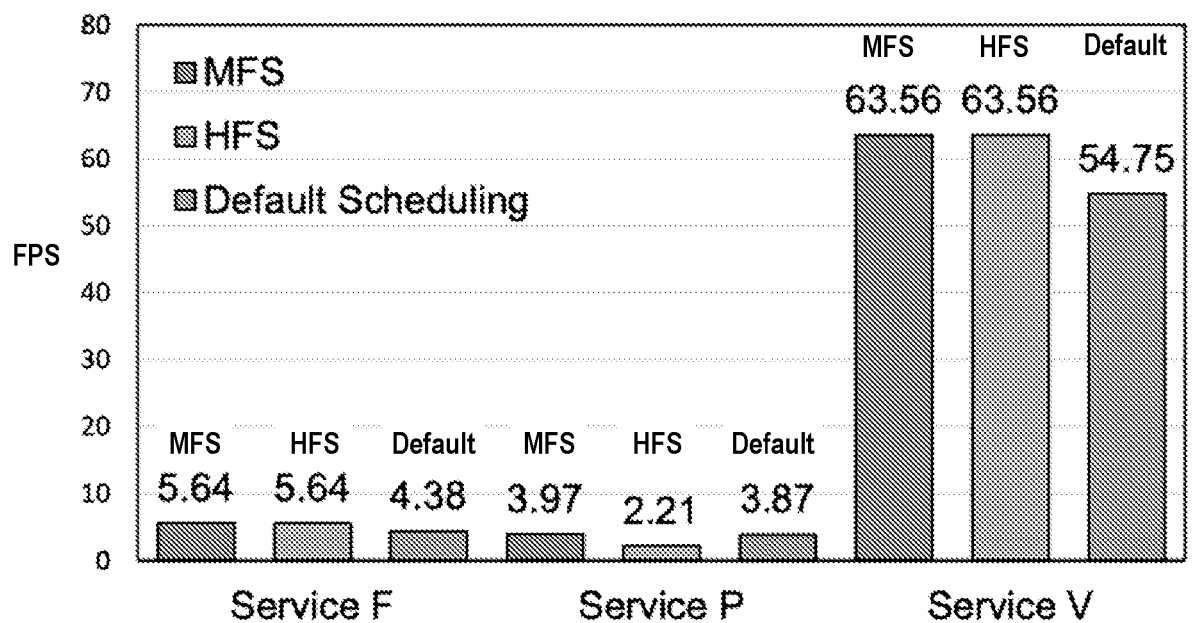
FIG. 8 graphically depicts a comparison between default scheduling results and MFS/HFS results, according to embodiments of the present disclosure.

In real-world application scenarios, it is common for either single or multiple AI-based services to work independently or concurrently for diverse tasks. FIG. 8 shows experiment results for both MFS and HFS on the 11 models of Service F, Service P, and Service V. For all three services, both MFS and HFS results show higher inference speed (FRS) compared to the default scheduling method. The results prove the effectiveness of the disclosed MFS and HFS methods for improving the inference speed of single and multiple AI-based services on heterogeneous edge devices, including CPU, GPU, and VPU.

D. COMPUTING SYSTEM EMBODIMENTS

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drive, solid state drive, or both), one or more network ports for communicating with external devices as well as various input and output (I/O) devices, such as a keyboard, mouse, touchscreen, stylus, microphone, camera, trackpad, display, etc. The computing system may also include one or more buses operable to transmit communications between the various hardware components.

Figure 9:
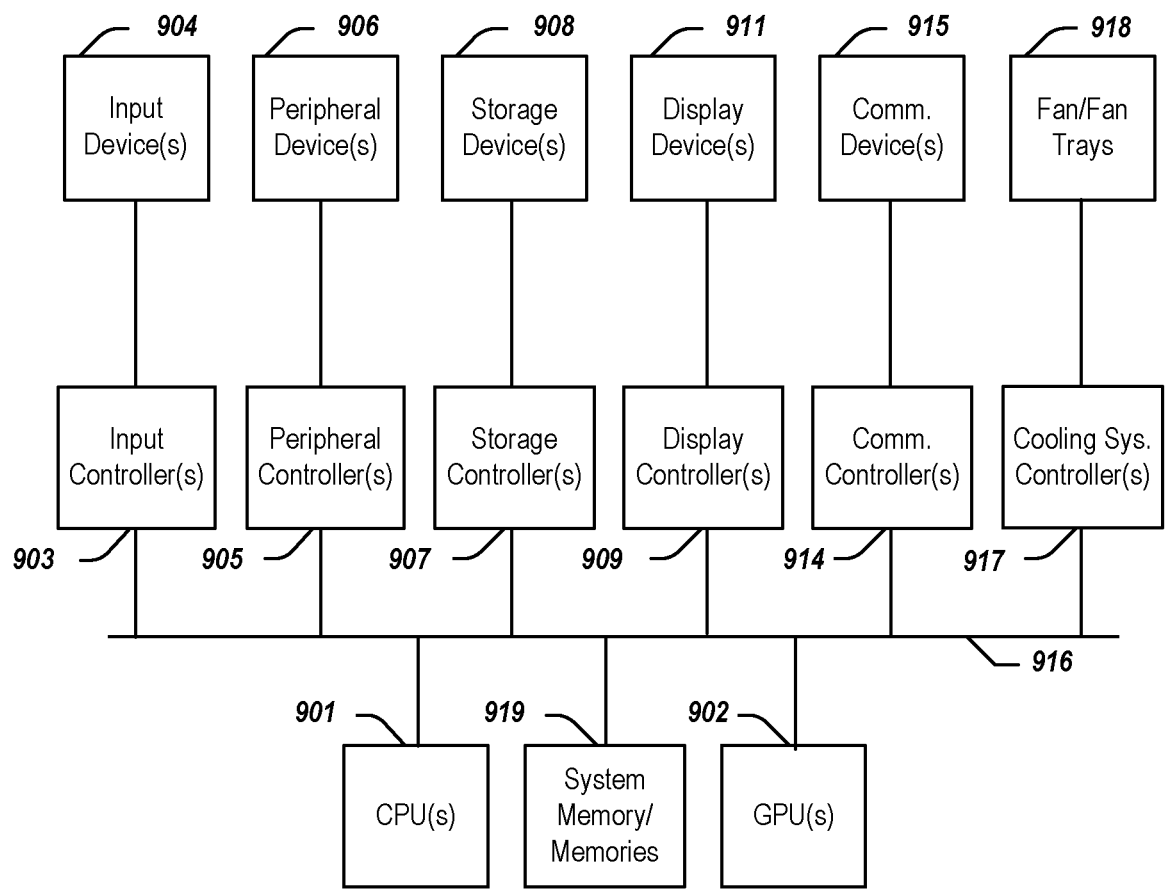
FIG. 9 depicts a simplified block diagram of a computing device/information handling system, according to embodiments of the present disclosure.

FIG. 9 depicts a simplified block diagram of an information handling system (or computing system), according to embodiments of the present disclosure. It will be understood that the functionalities shown for system 900 may operate to support various embodiments of a computing system—although it shall be understood that a computing system may be differently configured and include different components, including having fewer or more components as depicted in FIG. 9.

As illustrated in FIG. 9, the computing system 900 includes one or more CPUs 901 that provides computing resources and controls the computer. CPU 901 may be implemented with a microprocessor or the like, and may also include one or more graphics processing units (GPU) 902 and/or a floating-point coprocessor for mathematical computations. In one or more embodiments, one or more GPUs 902 may be incorporated within the display controller 909, such as part of a graphics card or cards. Thy system 900 may also include a system memory 919, which may comprise RAM, ROM, or both.

A number of controllers and peripheral devices may also be provided, as shown in FIG. 9. An input controller 903 represents an interface to various input device(s) 904. The computing system 900 may also include a storage controller 907 for interfacing with one or more storage devices 908 each of which includes a storage medium such as magnetic tape or disk, or an optical medium that might be used to record programs of instructions for operating systems, utilities, and applications, which may include embodiments of programs that implement various aspects of the present disclosure. Storage device(s) 908 may also be used to store processed data or data to be processed in accordance with the disclosure. The system 900 may also include a display controller 909 for providing an interface to a display device 911, which may be a cathode ray tube (CRT) display, a thin film transistor (TFT) display, organic light-emitting diode, electroluminescent panel, plasma panel, or any other type of display. The computing system 900 may also include one or more peripheral controllers or interfaces 905 for one or more peripherals 906. Examples of peripherals may include one or more printers, scanners, input devices, output devices, sensors, and the like. A communications controller 914 may interface with one or more communication devices 915, which enables the system 900 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 900 comprises one or more fans or fan trays 918 and a cooling subsystem controller or controllers 917 that monitors thermal temperature(s) of the system 900 (or components thereof) and operates the fans/fan trays 918 to help regulate the temperature.

In the illustrated system, all major system components may connect to a bus 916, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, PLDs, flash memory devices, other non-volatile memory devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for multi-model scheduling comprising:
   given a performance metric array for a group of neural network models to provide an artificial intelligence (AI) based service in a heterogeneous hardware platform comprising multiple edge devices, identifying a worst performance parameter in the performance metric array and a neural network model associated with the worst performance parameter;
   identifying an edge device, among the multiple edge devices, with the best performance parameter for the identified neural network model;
   allocating the identified edge device to the identified neural network model; and
   iteratively updating the performance metric array with the allocated edge device and the allocated neural network removed for subsequent identifying and allocation processes, until the group of neural network models are allocated to obtain a first set of allocation results;
   wherein the performance metric array comprises a plurality of performance parameters, each performance parameter is obtained by independently running one neural network model, among the group of neural network models, on one of the multiple edge devices.

2. The computer-implemented method of claim 1, wherein the multiple neural network models are deep neural network (DNN) models.

3. The computer-implemented method of claim 2, wherein the DNN models are trained and optimized to be fitted in the heterogeneous hardware platform.

4. The computer-implemented method of claim 1, wherein the multiple edge devices comprise one or more central processing units (CPUs), one or more graphics processing unit (GPU), and one or more vision processing unit (VPU).

5. The computer-implemented method of claim 1, wherein each performance parameter is a frame per second (FPS) defining a speed of a neural network model to process an input video or image frames for desired detection.

6. The computer-implemented method of claim 1, further comprising:
identifying an edge device, among the multiple edge devices, associated with the worst performance parameter;
identifying a neural network model, among the group of neural network models, with the best performance parameter for the identified edge device;
allocating the identified neural network model to the identified edge device; and
iteratively updating the performance metric array with the allocated edge device and the allocated neural network removed for subsequent identifying and allocation processes, until the group of neural network models are allocated to obtain a second set of allocation results.

7. The computer-implemented method of claim 6, further comprising:
responsive to the first set of allocation results being different from the second set of allocation results, running the group of neural network models on the heterogeneous hardware platform based on the first set of allocation results and the second sets allocation results respectively for a performance comparison, the set of allocation results, between the first set of allocation results and the second sets allocation results, having higher performance is chosen for final model allocation.

8. A computer-implemented method for multi-model scheduling, comprising:
given a performance metric array for a group of neural network models to provide an artificial intelligence (AI) based service in a heterogeneous hardware platform comprising multiple edge devices, identifying a worst performance parameter in the performance metric array and an edge device associated with the worst performance parameter;
identifying a neural network model, among the group of neural network models, with the best performance parameter for the identified edge device;
allocating the identified neural network model to the identified edge device; and
iteratively updating the performance metric array with the allocated edge device and the allocated neural network removed for subsequent identifying and allocation processes, until the group of neural network models are allocated to obtain a first set of allocation results;
wherein the performance metric array comprises a plurality of performance parameters, each performance parameter is obtained by independently running one neural network model, among the group of neural network models, on one of the multiple edge devices.

9. The computer-implemented method of claim 8, wherein the multiple neural network models are deep neural network (DNN) models.

10. The computer-implemented method of claim 9, wherein the DNN models are trained and optimized to be fitted in the heterogeneous hardware platform.

11. The computer-implemented method of claim 8, wherein the multiple edge devices comprise one or more central processing units (CPUs), one or more graphics processing unit (GPU), and one or more vision processing unit (VPU).

12. The computer-implemented method of claim 8, wherein each performance parameter is a frame per second (FPS) defining a speed of a neural network model to process an input video or image frames for desired detection.

13. The computer-implemented method of claim 8, further comprising:
identifying a neural network model, among the group of neural network models, associated with the worst performance parameter;
identifying an edge device, among multiple edge devices, with the best performance parameter for the identified neural network model;
allocating the identified edge device to the identified neural network model; and
iteratively updating the performance metric array with the allocated edge device and the allocated neural network removed for subsequent identifying and allocation processes, until the group of neural network models are allocated to obtain a second set of allocation results.

14. The computer-implemented method of claim 13, further comprising:
responsive to the first set of allocation results being different from the second set of allocation results, running the group of neural network models on the heterogeneous hardware platform based on the first set of allocation results and the second sets allocation results respectively for a performance comparison, the set of allocation results, between the first set of allocation results and the second sets allocation results, having higher performance is chosen for final model allocation.

15. A non-transitory computer-readable medium or media, comprising one or more sequences of instructions which, when executed by at least one processor, causes steps for multi-model scheduling comprising:
obtaining a performance metric array for a group of neural network models to provide an artificial intelligence (AI) based service in a heterogeneous hardware platform comprising multiple edge devices, the performance metric array comprises a plurality of performance parameters, each performance parameter is obtained by independently running one neural network model, among the group of neural network models, on one of the multiple edge devices;
implementing a model first scheduling (MFS) process and a hardware first scheduling (HFS) from the performance metric array to obtain MFS allocation results and HSF allocation results respectively, the MFS allocation results define allocations between the group of neural network models and the multiple edge devices using the MFS process, the HFS allocation results define allocations between the group of neural network models and the multiple edge devices using the HFS process; and
responsive to the MFS allocation results being different from the HFS allocation results, running the group of neural network models on the heterogeneous hardware platform based on the MFS allocation results and the HFS allocation results respectively for a performance comparison, the allocation results, between the MFS allocation results and the HFS allocation results, having higher performance are chosen for model allocations.

16. The non-transitory computer-readable medium or media of claim 15, wherein the multiple edge devices comprise one or more central processing units (CPUs), one or more graphics processing unit (GPU), and one or more vision processing unit (VPU).

17. The non-transitory computer-readable medium or media of claim 15, wherein implementing the MFS process comprising:
   identifying a worst performance parameter in the performance metric array and a neural network model associated with the worst performance parameter;
   identifying an edge device, among the multiple edge devices, with the best performance parameter for the identified neural network model;
   allocating the identified edge device to the identified neural network model; and
   iteratively updating the performance metric array with the allocated edge device and the allocated neural network removed for subsequent identifying and allocation processes, until the group of neural network models are allocated to obtain the MFS allocation results.

18. The non-transitory computer-readable medium or media of claim 15, wherein implementing the HFS process comprising:
   identifying a worst performance parameter in the performance metric array and an edge device associated with the worst performance parameter;
   identifying a neural network model, among the group of neural network models, with the best performance parameter for the identified edge device;
   allocating the identified neural network model to the identified edge device; and
   iteratively updating the performance metric array with the allocated edge device and the allocated neural network removed for subsequent identifying and allocation processes, until the group of neural network models are allocated to obtain the HFS allocation results.

19. A computer-implemented method for multi-model scheduling comprising:
   given a performance metric array for a group of neural network models to provide an artificial intelligence (AI) based service in a heterogeneous hardware platform comprising multiple edge devices, identifying a worst performance parameter in the performance metric array and a neural network model associated with the worst performance parameter;
   identifying an edge device, among the multiple edge devices, with the best performance parameter for the identified neural network model;
   allocating the identified edge device to the identified neural network model; and
   iteratively updating the performance metric array with the allocated edge device and the allocated neural network removed for subsequent identifying and allocation processes, until the group of neural network models are allocated to obtain a first set of allocation results;
   the method further comprising:
   identifying an edge device, among the multiple edge devices, associated with the worst performance parameter;
   identifying a neural network model, among the group of neural network models, with the best performance parameter for the identified edge device;
   allocating the identified neural network model to the identified edge device; and
   iteratively updating the performance metric array with the allocated edge device and the allocated neural network removed for subsequent identifying and allocation processes, until the group of neural network models are allocated to obtain a second set of allocation results.

20. The computer-implemented method of claim 19, wherein the multiple neural network models are deep neural network (DNN) models.

21. The computer-implemented method of claim 20, wherein the DNN models are trained and optimized to be fitted in the heterogeneous hardware platform.

22. The computer-implemented method of claim 19, wherein the multiple edge devices comprise one or more central processing units (CPUs), one or more graphics processing unit (GPU), and one or more vision processing unit (VPU).

23. The computer-implemented method of claim 19, wherein the performance metric array comprises a plurality of performance parameters, each performance parameter is obtained by independently running one neural network model, among the group of neural network models, on one of the multiple edge devices.

24. The computer-implemented method of claim 23, wherein each performance parameter is a frame per second (FPS) defining a speed of a neural network model to process an input video or image frames for desired detection.

25. The computer-implemented method of claim 19, further comprising:
   responsive to the first set of allocation results being different from the second set of allocation results, running the group of neural network models on the heterogeneous hardware platform based on the first set of allocation results and the second sets allocation results respectively for a performance comparison, the set of allocation results, between the first set of allocation results and the second sets allocation results, having higher performance is chosen for final model allocation.

26. A computer-implemented method for multi-model scheduling, comprising:
   given a performance metric array for a group of neural network models to provide an artificial intelligence (AI) based service in a heterogeneous hardware platform comprising multiple edge devices, identifying a worst performance parameter in the performance metric array and an edge device associated with the worst performance parameter;
   identifying a neural network model, among the group of neural network models, with the best performance parameter for the identified edge device;
   allocating the identified neural network model to the identified edge device; and
   iteratively updating the performance metric array with the allocated edge device and the allocated neural network removed for subsequent identifying and allocation processes, until the group of neural network models are allocated to obtain a first set of allocation results;
   the method further comprising:
   identifying a neural network model, among the group of neural network models, associated with the worst performance parameter;
   identifying an edge device, among multiple edge devices, with the best performance parameter for the identified neural network model;
   allocating the identified edge device to the identified neural network model; and
   iteratively updating the performance metric array with the allocated edge device and the allocated neural network removed for subsequent identifying and allocation processes, until the group of neural network models are allocated to obtain a second set of allocation results.

27. The computer-implemented method of claim 26, wherein the multiple neural network models are deep neural network (DNN) models.

28. The computer-implemented method of claim 27, wherein the DNN models are trained and optimized to be fitted in the heterogeneous hardware platform.

29. The computer-implemented method of claim 26, wherein the multiple edge devices comprise one or more central processing units (CPUs), one or more graphics processing unit (GPU), and one or more vision processing unit (VPU).

30. The computer-implemented method of claim 26, wherein the performance metric array comprises a plurality of performance parameters, each performance parameter is obtained by independently running one neural network model, among the group of neural network models, on one of the multiple edge devices.

31. The computer-implemented method of claim 30, wherein each performance parameter is a frame per second (FPS) defining a speed of a neural network model to process an input video or image frames for desired detection.

32. The computer-implemented method of claim 26, further comprising:

responsive to the first set of allocation results being different from the second set of allocation results, running the group of neural network models on the heterogeneous hardware platform based on the first set of allocation results and the second sets allocation results respectively for a performance comparison, the set of allocation results, between the first set of allocation results and the second sets allocation results, having higher performance is chosen for final model allocation.

* * * * *